(12) United States Patent
Gleeson et al.

(10) Patent No.: US 11,339,882 B1
(45) Date of Patent: May 24, 2022

(54) BUTTERFLY CHECK VALVE

(71) Applicant: AGF Manufacturing, Inc., Malvern, PA (US)

(72) Inventors: Bentley F. Gleeson, Malvern, PA (US); George J. McHugh, IV, Malvern, PA (US); James P. McHugh, Newtown Square, PA (US)

(73) Assignee: AGF MANUFACTURING, INC., Malvern, PA (US)

( * ) Notice: Subject to any disclaimer, the term of this patent is extended or adjusted under 35 U.S.C. 154(b) by 0 days.

(21) Appl. No.: 17/133,934

(22) Filed: Dec. 24, 2020

(51) Int. Cl.
*F16K 15/18* (2006.01)
*F16K 31/60* (2006.01)
*F16K 15/03* (2006.01)

(52) U.S. Cl.
CPC .......... *F16K 15/1821* (2021.08); *F16K 15/03* (2013.01); *F16K 15/1841* (2021.08); *F16K 31/60* (2013.01)

(58) Field of Classification Search
CPC ...... F16K 15/181; F16K 15/033; F16K 15/18; F16K 15/184; F16K 15/1841; Y10T 137/88054; Y10T 137/7898–7903
See application file for complete search history.

(56) References Cited

U.S. PATENT DOCUMENTS

| | | | | |
|---|---|---|---|---|
| 2,266,421 A | * | 12/1941 | Griffith | F16K 1/2021 137/463 |
| 3,068,903 A | * | 12/1962 | Haenky | F16K 15/188 137/630.22 |
| 3,491,796 A | * | 1/1970 | Scaramucci | F16K 5/0605 137/614.2 |
| 3,955,592 A | * | 5/1976 | Guyton | F16K 15/03 137/329 |
| 4,079,751 A | | 3/1978 | Partridge et al. | |
| 4,225,114 A | | 9/1980 | Barthelemy et al. | |
| 4,281,680 A | | 8/1981 | Ripert | |

(Continued)

FOREIGN PATENT DOCUMENTS

| | | |
|---|---|---|
| KR | 10-2010-0049711 A | 5/2010 |
| KR | 10-2011-0018749 A | 2/2011 |
| KR | 10-2011-0056848 A | 5/2011 |

OTHER PUBLICATIONS

Notification of Transmittal of the International Search Report (Forms PCT/ISA/220 and PCT/ISA/210) and the Written Opinion of the International Searching Authority (Form PCT/ISA/237) dated Apr. 6, 2022, by the International Application Division Korean Intellectual Property Office in corresponding International Application No. PCT/US2021/063216. (9 pages).

*Primary Examiner* — Kevin F Murphy
(74) *Attorney, Agent, or Firm* — Buchanan Ingersoll & Rooney PC

(57) ABSTRACT

A butterfly check valve is disclosed, which includes a housing defining an interior chamber having an inlet and an outlet; a control valve configured to control a flow between the inlet and the outlet, the control valve including a valve member movable to an open position in which a flow is permitted between the inlet and the outlet and a closed position in which the flow is blocked between the inlet and the outlet; and a check valve arranged downstream of the control valve, the check valve including a dome-shaped clapper configured to seal against an outer periphery of a clapper seat within the interior chamber of the housing in a reverse flow from the outlet to the inlet.

19 Claims, 5 Drawing Sheets

(56) References Cited

U.S. PATENT DOCUMENTS

| | | | |
|---|---|---|---|
| 5,107,888 A * | 4/1992 | Dunmire | E03C 1/106 |
| | | | 137/512 |
| 5,406,979 A | 4/1995 | McHugh | |
| 6,114,823 A | 9/2000 | Doner et al. | |
| 6,206,034 B1 | 3/2001 | McHugh | |
| 6,349,736 B1 * | 2/2002 | Dunmire | E03B 7/077 |
| | | | 137/15.19 |
| 6,396,404 B1 | 5/2002 | McHugh | |
| 7,152,622 B2 * | 12/2006 | Scaramucci | F16K 15/033 |
| | | | 137/527.2 |
| 2018/0043197 A1 | 2/2018 | Ringer et al. | |

\* cited by examiner

BUTTERFLY CHECK VALVE

FIELD OF DISCLOSURE

The present disclosure relates generally to valves and more particularly relates to a butterfly check valve for use, for example, in a fire suppression system.

BACKGROUND

In a typical fire suppression water sprinkler system as installed in many buildings, an array of individual fire sprinklers is supplied with water through a main conduit and various branch conduits. The individual fire sprinklers are generally provided with a member that melts when the ambient temperature reaches a predetermined level indicative of a fire. The melting of the member opens a fire sprinkler to spray water in order to suppress the fire. The individual fire sprinklers are provided with meltable members so that the spray of water will hopefully be limited to the region of the building where the fire is present. In this way, the extent of water damage may be minimized.

After a fire, and especially during maintenance and renovation, it may become necessary to replace one or more of the individual water sprinklers. At such times it is desirable to be able to drain the system conduits of water, so that the removal of one or more of the individual water sprinklers will not result in a flow of water through the fitting for the water sprinkler. Accordingly, it is conventional in the art to provide a valve which isolates the flow of water to the arrangement of individual water sprinklers when service or inspection is needed.

As set forth, control valves can be one of several different types of valves, but because the goal is to minimize valve size and length for piping up to 8" in nominal diameter, a butterfly valve may be preferred. By the nature of its design, the butterfly valve takes up a minimal amount of space while closed because its flat disk is perpendicular to the axis of the housing. While open, however, the disk extends an axial distance approximately equal to the housing's inside diameter. Any component immediately before or after it must allow clearance for the actuation between the two states.

A check valve is typically plumbed downstream of the control valve so it can be isolated from system pressure in case the internal parts of the check valve need to be inspected as is required, for example, by the Standard for the Inspection, Testing, and Maintenance of Water-Based Fire Protection Systems as set forth in National Fire Protection Associated 25 (NFPA 25), for example, every 5 years. The most common embodiment of the check valve's clapper is a flat disk with a rubberized component which creates a seal against a seat in the event of reverse flow. If the goal is to minimize the axial length of a combined butterfly and check valve assembly, a flat clapper does not provide the most efficient shape to ensure clearance between the flat clapper and the movement of the disk of the control valve in the form of a butterfly valve.

BRIEF SUMMARY

In accordance with the above, it would be desirable to minimize the valuable axial plumbing space used by two fire sprinkler components, the control valve and check valve are contained within a single valve body, and wherein the control valve and the check valve can be in relative close proximity to one another, and can include, for example, the check valve having a dome-shaped or concave shaped clapper.

In accordance with an aspect, a butterfly check valve is disclosed, comprising: a housing defining an interior chamber having an inlet and an outlet; a control valve configured to control a flow between the inlet and the outlet, the control valve including a valve member movable to an open position in which a flow is permitted between the inlet and the outlet and a closed position in which the flow is blocked between the inlet and the outlet; and a check valve arranged downstream of the control valve, the check valve including a dome-shaped clapper configured to seal against an outer periphery of a clapper seat within the interior chamber of the housing in a reverse flow from the outlet to the inlet.

DETAILED DESCRIPTION OF EXEMPLARY EMBODIMENTS

Set forth below with reference to the accompanying drawings is a detailed description of embodiments of a butterfly check valve 100.

Figure 1:
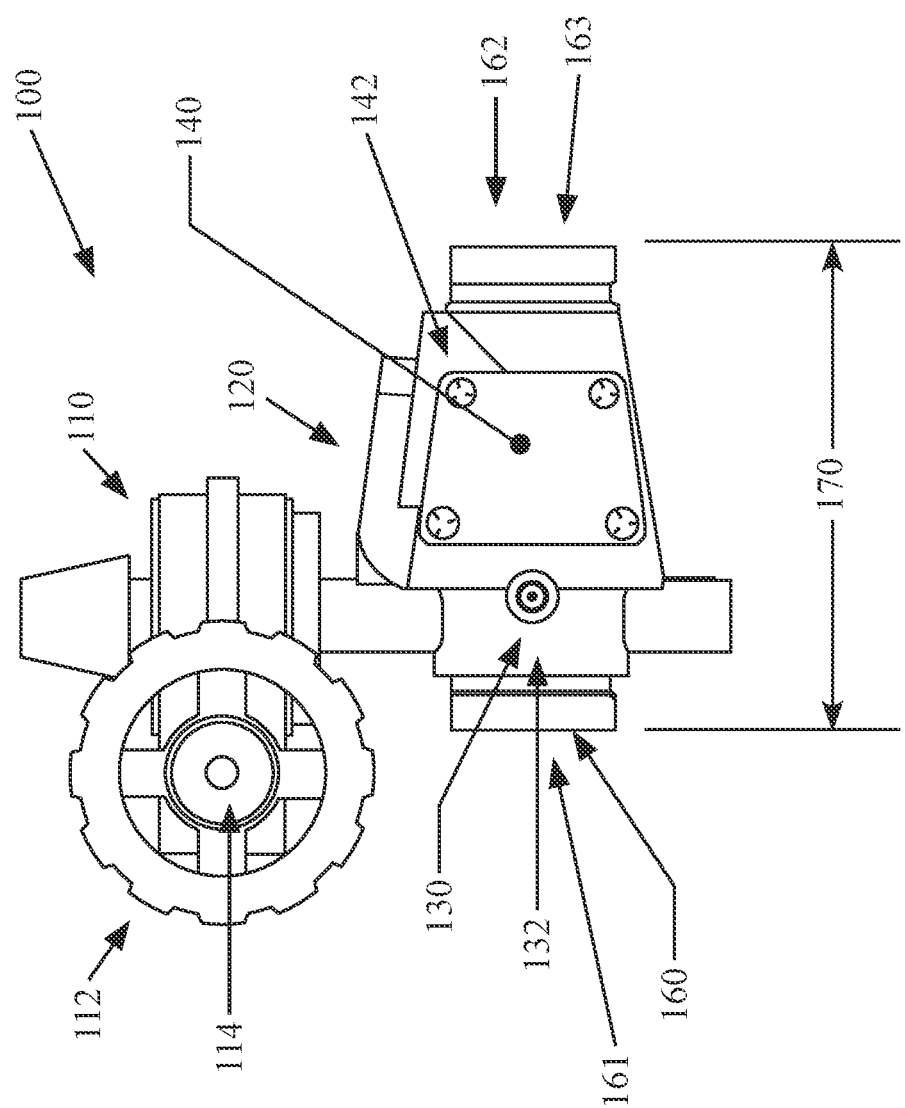
FIG. 1 is a side view of a butterfly check valve in accordance with an exemplary embodiment disclosed here.
Figure 2:
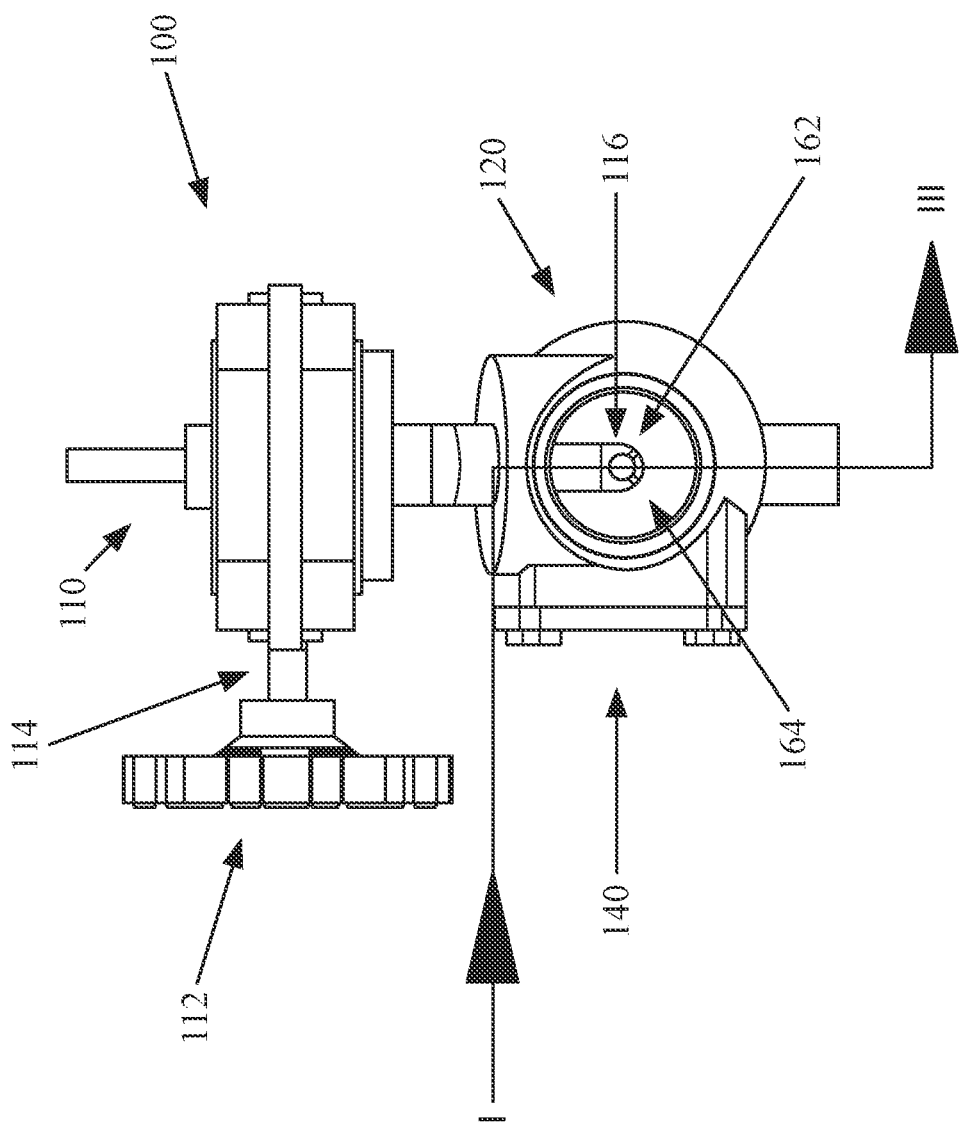
FIG. 2 is an end view of the butterfly check valve in accordance with the exemplary embodiment disclosed here.

FIGS. 1 and 2 are a side view and an end view, respectively, of a butterfly check valve 100 in accordance with an exemplary embodiment disclosed here. As shown in FIGS. 1 and 2, the butterfly check valve 100 includes a valve operator 110, a handle 112 having a shaft 114, a housing 120, a system pressure port 130, a removable inspection opening panel 140, an inlet 160, and an outlet 162. The housing 120 includes the inlet 160 and the outlet 162. In accordance with an aspect, the inlet 160 and the outlet 162 are provided with grooves to facilitated connection of the inlet 160 and the outlet 162 to other fittings in a plumbing assembly. For example, the inlet 160 and the outlet 162 can be grooved or threaded ends 161, 163, for example, American Water Works Association (AWWA) C606 ends. In accordance with an embodiment, the inlet 160 and the outlet 162 are generally collinear with one another. In accordance with an embodiment, a length 170 of the housing 120, for example, may be at least 8 inches or more, for example, the length of housing 120 may be approximately 8⅜ inches, for example, for a 2½ inch nominal diameter valve 100.

As shown in FIG. 1, the housing 120 include the removable inspection opening panel 140, which can be removed so that, for example, a check valve 300 (FIG. 3) can be inspected as required. The removable inspection opening panel 140 can secured to the housing 120, for example, with a plurality of fittings 142, for example, a plurality of screws.

In accordance with another aspect, an axial length of the butterfly valve 100 can be influenced based on the required port 130, which measures the system side pressure upstream of the clapper 310 of the check valve 300. Usually, the through hole for this port 130 is drilled through the body of the housing and into the interior chamber or interior space (e.g., fluid space) at the full diameter of the tap drill. However, in this particular case, doing so would add undesired distance between a disk 202 of a valve member 200 (FIG. 3) and the clapper 310 to ensure the seat of the clapper is not comprised by the drill hole and the disk 202 of the valve member 200 is not damaged by the tap drill. Therefore, in accordance with an aspect, a significantly smaller diameter through hole 132 may be used at the bottom of the tap drill's profile to connect the port to the internal fluid pressure. In accordance with an embodiment, the passage is configured to be large enough to accurately communicate the internal pressure to an externally mounted gauge.

Figure 3:
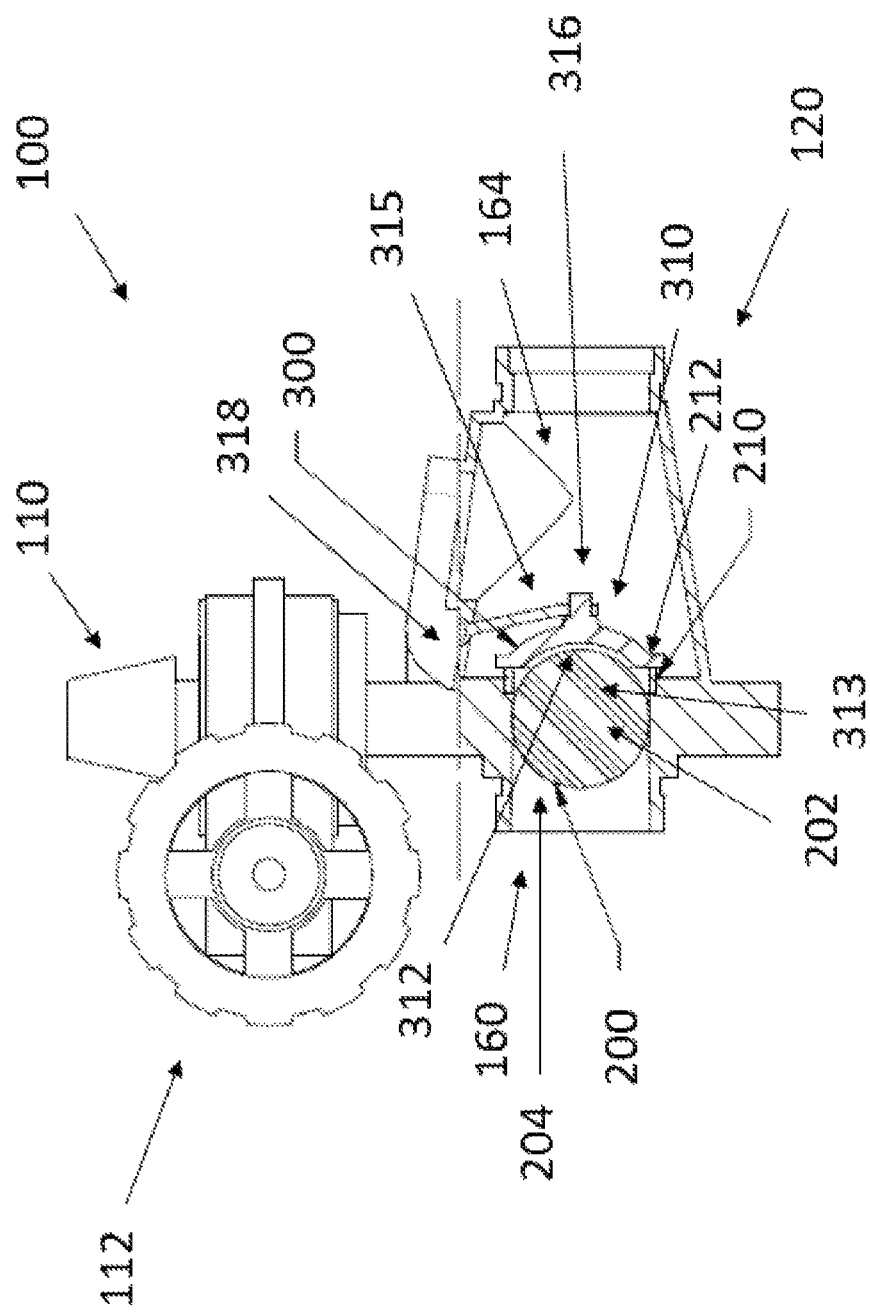
FIG. 3 is a side view with partial cross section along the line III-III of FIG. 2 of the butterfly check valve disclosed here.

FIG. 3 is a side view with partial cross section along the line III-III of FIG. 2 of the butterfly check valve 100 disclosed here. As shown in FIG. 3, the butterfly check valve 100 includes a valve member 200 comprising a disk 202 and a check valve 300 having a clapper 310 arranged on a downstream side of the valve member 200. The valve member 200 is provided within an interior chamber (e.g., opening) 164 extending from the inlet 160 to the outlet 162. The disk 202 has an outer periphery (or outer diameter) 204 corresponding to the inner configuration of the interior chamber 164 so that the disk 202 may be received snugly (e.g., tightly) within the interior chamber 164 to thereby prevent communication between the inlet 160 and the check valve 300.

Figure 4:
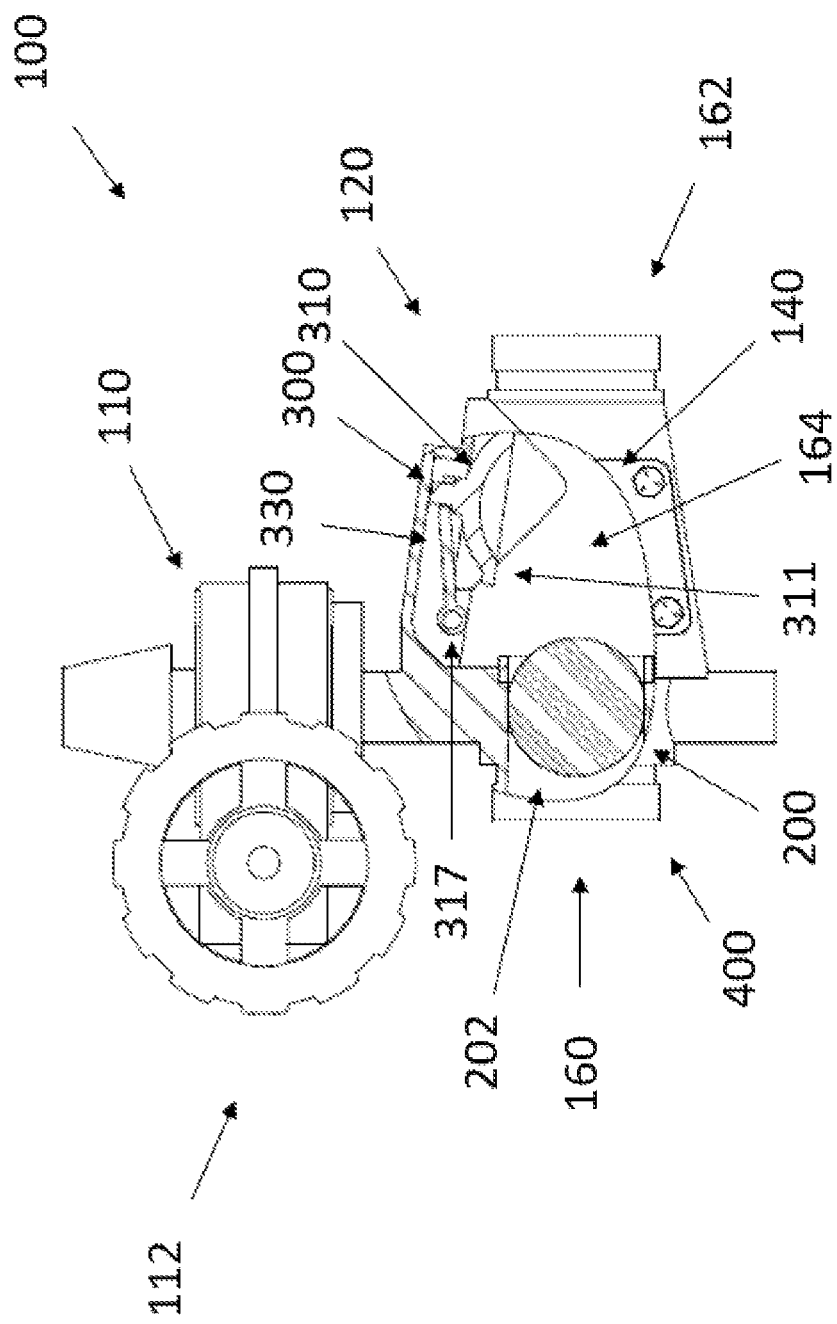
FIG. 4 is a side view with partial cross section of the butterfly check valve disclosed here in an open position.

In accordance with an aspect, the outer periphery 204 of the disk 202 is round or circular. In cross-section (FIG. 5), the disk 200 may have a uniform thickness, or alternatively, may have one or more grooves 208 arranged in central portion of the disk 202 to improve the flow through the butterfly check valve 100 when the valve 100 is an open position as shown in FIG. 4. For example, the one or more grooves 208 may be two grooves, one groove arranged on each side of the disk 202. In accordance with an aspect, the outer periphery 204 of the valve member 200 may be provided with a resilient member or with any suitable, conventional arrangement to facilitate a sealing relationship between the valve member 200 and the inner configuration of the interior chamber 164.

Figure 5:
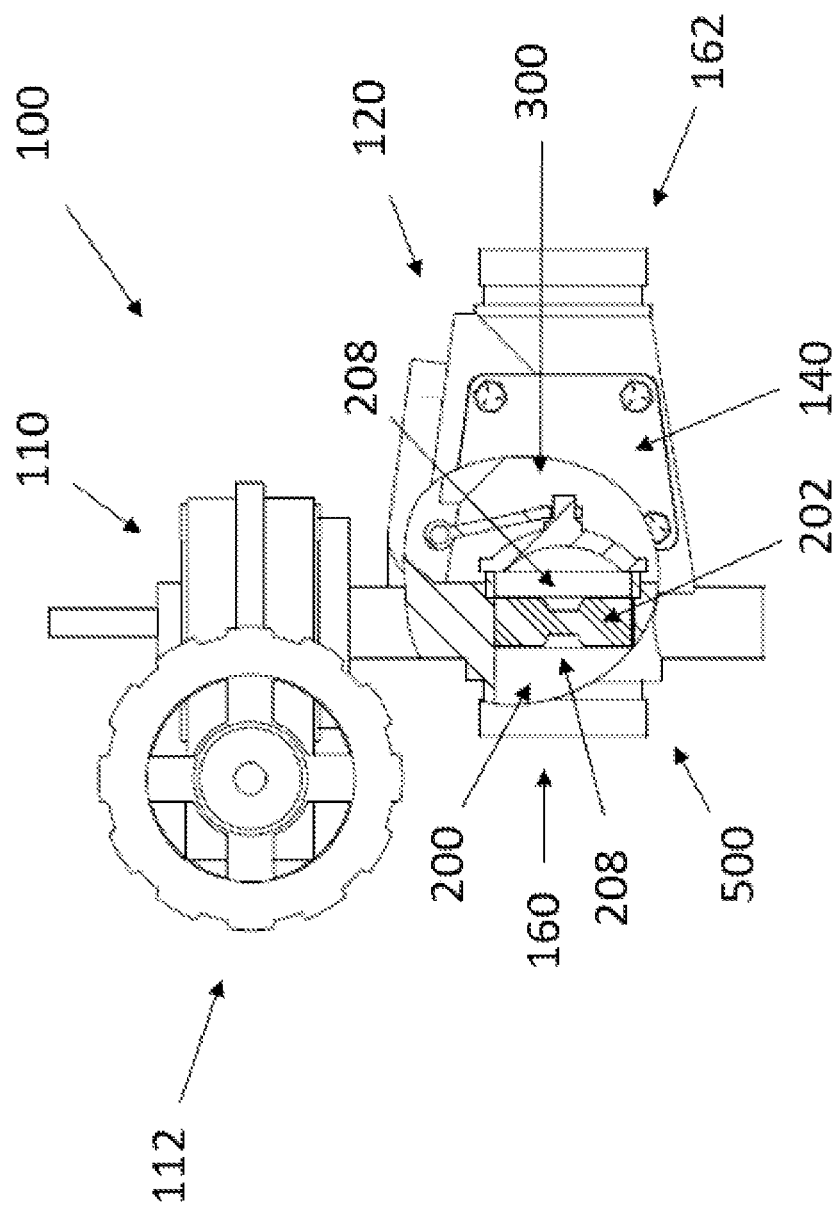
FIG. 5 is another side view with partial cross section of the butterfly check valve disclosed here in a closed position.

As shown in FIG. 3, the valve member 200 is mounted for rotation about an axis extending through the valve member 100. The valve operator 110 is provided above the valve member 200 to move the valve member 200 between an open position 400 (as shown in FIG. 4) and a closed position 500 (as shown in FIG. 5). In the closed position 500, the valve member 200 prevents communication between the inlet 160 and the outlet 162. The valve operator 110 includes a handle 112 which enables the valve member 200 to be moved manually between the open position 400 and the closed position 500 by rotating the handle 112. A gear arrangement or gearing arrangement is provided between a shaft 114 carrying the handle 112 and a valve shaft 116 (FIG. 2), which engages the valve member 200. The valve shaft 116 is fixedly mounted with respect to the valve member 200 so that the valve member 200 rotates with the rotation of the valve shaft 116. For example, the gear ratio between the handle 112 and the valve shaft 116 is such that the valve member 200 closes slowly and avoids "water hammer" from a too rapid opening or closing of the valve 100.

If desired, and if permitted by the applicable codes and regulations, the valve operator 110 may be motorized or otherwise mechanically driven by a motor or by some other arrangement. In accordance with an embodiment, for example, the valve operator 110 can include internal stops so that the valve member 200 may not be moved beyond the open position 400 and may not be moved beyond the closed position 500. If desired, the valve operator 110 may also have an indicator to visually show that the valve member 200 is in a fully open position or in a fully closed position.

In accordance with an embodiment, the valve member 200 may be carried on a lower valve shaft, which may comprise an open tube or pipe. The valve member 200 is free to pivot about the lower shaft between the open position 400 and the closed position 500. If desired, packing or sealing material, for example, an "O-ring" may be provided about the valve shaft 116 between the valve member 200 and the valve housing 120 to prevent or reduce leakage from the valve. A similar packing or sealing material may also be provided about the lower shaft between the valve member 200 and the valve housing 120.

As shown in FIG. 3, the check valve 300 has a clapper 310 having a dome-shape (e.g., concave-shape profile) 312 on an upstream side 313 of the clapper 310. In accordance with an aspect, the check valve 300 is a spring-loaded clapper (e.g., a spring-biased clapper) having a dome-shaped clapper 310, a hinge (or hinge member) 315, which is connected on a downstream side 316 of the clapper 310, and a spring or spring mechanism 318. The spring or spring mechanism 318 is configured to push or extend the clapper 310 onto an outer periphery 212 of the clapper seat 210 to prevent a flow in the upstream direction from the outlet 162. In accordance with an embodiment, an outer periphery 311 (FIG. 4) of the dome-shaped clapper 310 is generally circular, which is configured to contact the outer periphery 212 of the clapper seat 210, which also has a generally circular shape.

In accordance with an aspect, the dome-shaped clapper 310 can enable the check valve 300 to be placed measurably closer to the valve member 200 because of the dome-shape (e.g., concave profile) of the clapper 310 since the profile of the dome-shaped clapper 312, which provides a natural clearance for the disk 202 of the butterfly valve 100 to rotate when the butterfly valve 100 is actuated between the open state 400 and closed state 500. In addition, the dome-shaped 312 of the clapper 310 will have a relatively stronger profile, for example, than a relatively flat disk for resisting backflow pressures and will allow for the use of a relatively larger diameter clapper 310 and/or a relatively thinner material for the clapper 310.

In accordance with an embodiment, the seat 210 for the clapper 310 of the check valve 300 may be a full-port, meaning, for example, that the seat 210 does not cause a reduction in the flow path diameter relative to a nominal diameter of the pipes (e.g., plumbing fittings) which are connect to the housing 120 of the valve 100. Typically, for example, check valves used in fire suppression systems have a reduced port (e.g., through diameter is reduced) to save cost and/or because of a relatively flat profile of the clapper, which can be relatively weak (e.g., can give way under pressure). In the case of where the check valve 300 and the valve member 200 of a butterfly valve are in relative close proximity, a sudden reduction in diameter over a short axial distance would be required when using a traditional reduced port check valve seat, which type of transition may result, for example, in an undesirably high pressure loss. In accordance with an embodiment of the butterfly check valve 100, with the user of a full-port clapper seat 210, the butterfly check valve 100 will have negligible pressure loss and can be used because of the aforementioned strength a dome-shaped 312 profile of the clapper 310.

FIG. 4 is a side view with partial cross section of the butterfly check valve 100 disclosed here in an open position 400. As shown in FIG. 4, when the handle 112 has been rotated to move the valve member 200 to the open position 400, the opening 164 is directed toward the inlet 160 of the valve housing 120 and is in communication with the inlet 160 of the valve 100. If there is a flow from the inlet 160 of the valve 100 to the outlet 162 of the valve 100, the flow will enter the valve 100 and pass through the valve member 200. As shown in FIG. 4, the dome-shaped clapper 310 of the check valve 300 will pivot upward around a central pivot (e.g., a pin or shaft) 317 as a result of the flow from the inlet 160 to the outlet 162 into a chamber 330. In accordance with an embodiment, the chamber 300 is configured to receive the dome-shaped clapper 310 of the check valve 300 without interfering and/or altering the flow from the inlet 160 to the outlet 162 of the valve 100.

FIG. 5 is another side view with partial cross section of the butterfly check valve 100 disclosed here in a closed position 500. As shown in FIG. 5, when the valve member 200 is in the closed position, the dome-shaped clapper 310 of the check valve 300 rotates towards the upstream side and seals against the full-port clapper seat 210 to prevent a reverse flow.

The principles, exemplary embodiments and mode of operation of the present invention have been described in the foregoing specification. However, the invention which is intended to be protected is not to be construed as limited to the particular embodiments disclosed. The embodiments are therefore to be regarded as illustrative rather than as restrictive. Variations and changes may be made without departing from the spirit of the present invention. Accordingly, it is expressly intended that all such equivalents, variations and changes which fall within the spirit and scope of the present invention as defined in the claims be embraced thereby.

What is claimed is:

1. A butterfly check valve, comprising:
   a housing defining an interior chamber having an inlet and an outlet;
   a control valve configured to control a flow between the inlet and the outlet, the control valve including a disk-shaped valve member movable to an open position in which a flow is permitted between the inlet and the outlet and a closed position in which the flow is blocked between the inlet and the outlet;
   a check valve arranged immediately downstream of the control valve, the check valve including a dome-shaped clapper configured to seal against an outer periphery of a clapper seat within the interior chamber of the housing in a reverse flow from the outlet to the inlet; and
   wherein the dome-shaped clapper is configured to allow the disk-shaped valve member of the control valve to rotate within the dome-shaped clapper when the control valve is actuated between the open position and the closed position.

2. The butterfly check valve according to claim 1, further comprising:
   a valve operator configured to enable the disc-shaped valve member to be moved manually between the open position and the closed position by rotating a handle.

3. The butterfly check valve according to claim 1, further comprising:
   a concave-shape profile on an upstream side of the dome-shaped clapper.

4. The butterfly check valve according to claim 3, wherein an outer periphery of the dome-shaped clapper is generally circular.

5. The butterfly check valve according to claim 1, wherein the inlet and the outlet are generally collinear with one another.

6. The butterfly check valve according to claim 1, wherein the disk-shaped valve member comprises a disk which is rotatable about an axis.

7. The butterfly check valve according to claim 6, wherein the disk includes an outer periphery having a generally round shape.

8. The butterfly check valve according to claim 7, wherein the disk in cross-section includes one or more grooves in a central portion of the disk.

9. The butterfly check valve according to claim 1, wherein the dome-shaped clapper is a spring-loaded clapper configured to rotate upward upon the flow being permitted between the inlet and the outlet of the housing.

10. The butterfly check valve according to claim 9, wherein the dome-shaped clapper includes a hinge on a downstream side of the dome-shaped clapper.

11. The butterfly check valve according to claim 1, wherein the clapper seat is a full-port clapper seat.

12. The butterfly check valve according to claim 1, further comprising:
    a system port configured to receive an externally mounted gauge, the system port configured to measure a pressure upstream of the dome-shaped clapper and having a reduced diameter through hole on a bottom edge of the system port.

13. The butterfly check valve according to claim 1, wherein the inlet and the outlet of the housing are configured to be connected to another plumbing fitting.

14. The butterfly check valve according to claim 1, wherein each of the inlet and the outlet includes a female threaded end.

15. The butterfly check valve according to claim 1, wherein the control valve and the check valve are contained within a single valve body.

16. A butterfly check valve, comprising:
    a housing defining an interior chamber having an inlet and an outlet;
    a control valve configured to control a flow between the inlet and the outlet, the control valve including a disk-shaped valve member movable to an open position in which a flow is permitted between the inlet and the outlet and a closed position in which the flow is blocked between the inlet and the outlet;
    a check valve arranged immediately downstream of the control valve, the check valve including a dome-shaped clapper configured to seal against an outer periphery of a clapper seat within the interior chamber of the housing in a reverse flow from the outlet to the inlet, the dome-shaped clapper being a spring-loaded clapper configured to rotate upward upon the flow being permitted between the inlet and the outlet of the housing; and
    wherein the dome-shaped clapper is configured to allow the disk-shaped valve member of the control valve to rotate within the dome-shaped clapper when the control valve is actuated between the open position and the closed position.

17. The butterfly check valve according to claim 16, further comprising:
    a valve operator configured to enable the disc-shaped valve member to be moved manually between the open position and the closed position by rotating a handle.

18. The butterfly check valve according to claim 16, further comprising:
    a concave-shape profile on an upstream side of the dome-shaped clapper, and wherein an outer periphery of the dome-shaped clapper is generally circular.

19. The butterfly check valve according to claim 16, wherein the disk-shaped valve member comprises a disk which is rotatable about an axis, the disk including an outer periphery having a generally round shape.

\* \* \* \* \*